Patented Dec. 28, 1926.

1,611,939

UNITED STATES PATENT OFFICE.

HARRY A. NOYES, OF GREENWICH, CONNECTICUT, ASSIGNOR TO TEXAS GULF SULPHUR COMPANY, OF BAY CITY, TEXAS, A CORPORATION OF TEXAS.

SULPHUR MATERIAL.

No Drawing. Application filed January 16, 1924. Serial No. 686,632.

This invention relates to sulphur-containing materials, and more particularly to the preparation of sulphur in finely divided physical condition.

The invention has for its object the provision of an improved method of preparing sulphur in a finely divided physical condition. More particularly, the invention contemplates the provision of an improved method of conditioning sulphur for use in spraying and the like. These and other objects of the invention will be more clearly brought out in the following description.

Sulphur is a recognized valuable constituent in various germicides, fungicides and similar preparations. In some cases the sulphur is combined with one or more other constituents, as, for example, in the well-known lime-sulphur and copper-sulphur compounds, and in other cases the sulphur itself is alone relied upon as the effective germicidal or fungicidal agent. The present invention especially relates to the latter class of preparations, although the principles of the invention are equally well applicable to preparations containing other constituents besides sulphur.

In using sulphur as a germicide, fungicide, or the like, it is customary to either incorporate finely divided sulphur in an appropriate liquid, such as water, or to apply the finely divided sulphur in a dusting mixture. The resulting mixture, whether liquid or dry, is placed in a suitable dispenser of spray material and is sprayed on the desired objects by means of well-known appliances. The effectiveness of such a sulphur spray depends to a large extent upon the fineness or degree of subdivision of the individual particles of sulphur. Where the sulphur is colloidal, such a sulphur spray is very effective. This seems to be due not only to the greater difficulty of maintaining the coarser or larger particles of sulphur in suspension in the liquid spray, but also to the greater activity as a germicide or fungicide of sulphur in the extreme state of subdivision. Thus, it appears that the action of the sulphur as a germicide, fungicide, and the like, is in some measure dependent upon the fineness of the sulphur particles, the finer or smaller these particles the more effective is the action of the sulphur in this respect. Temperature too seems to have some influence, the action of the sulphur being more marked the higher the temperature. Thus, colloidal sulphur is found to be a very effective germicide or fungicide at all ordinary temperatures, while commercial sulphur flour and flowers of sulphur require temperatures of 70° F. and higher to function as germicides or fungicides.

Methods for the preparation of colloidal sulphur are known (see, for example, the United States patents of Raymond F. Bacon, Nos. 1,140,865 and 1,140,866), but the present cost of preparing truly colloidal sulphur is such as to materially restrict and limit the use of this form of sulphur as a spray material. The present invention involves a method of preparing or conditioning sulphur for use as a spray material by which the sulphur is economically and effectively reduced to a state of physical subdivision approaching colloidal sulphur. Thus, by the improved method of the invention, crude sulphur, commercial sulphur flour and flowers of sulphur can be readily and cheaply reduced to a state of physical subdivision which, if not truly colloidal, partakes of the qualities of or resembles the colloidal state.

Sulphur cannot be reduced by the ordinary methods of grinding to a degree of fineness or subdivision approximating or approaching the colloidal state. Ball mills and pebble mills are generally recognized as the most suitable types of apparatus for the fine grinding of solid substances. In the operation of these mills, the substance to be ground is suspended in a liquid, usually water, and the effectiveness of the grinding operation is due in large measure to the intimate contact between the abrasive or grinding agencies (balls, stones, pebbles, etc.) and the material to be ground in consequence of the latter's suspension in a liquid. Sulphur is not readily wetted by water. In fact, it has long been recognized that sulphur is one of a numerous class of substances whose surfaces are characteristically "greasy" and in consequence of this property repel water. This resistance of sulphur to wetting appears to inhibit the proper suspension of the sulphur in water for effective grinding. Thus, I have found that commercial sulphur flour or flowers of sulphur can for the most part be ground in a ball mill in the presence of water alone only to about 300 mesh material.

The present invention is based upon my discovery that the resistance of sulphur to wetting by water can be substantially overcome by associating with the sulphur certain substances which partake of the nature of sulphides. Thus, I have found, that in the presence of sulphides, and particularly calcium sulphide, sulphur appears to be readily wet by water, and that in the presence of such substances sulphur can be readily reduced to a state of subdivision that approaches the colloidal state.

In carrying out the present invention, crude sulphur, refined sulphur, commercial sulphur flour or flowers of sulphur is ground in a ball mill, or the like, in the presence of a sulphide or a compound possessing the properties of a sulphide. The sulphide should preferably be soluble to some extent in water. Where the surphur is to be used as a spray material, I prefer to employ calcium sulphide or a similar sulphide which may have some beneficial effect on the action of the sulphur as a germicide or fungicide. The properties of the sulphide with respect to sulphur make this grinding procedure a very satisfactory way of preparing a spray material containing extremely finely divided and some colloidal sulphur. The amount of colloidal sulphur and the state of fineness of the remaining sulphur can be determined and controlled to a large extent by regularly established methods of fining.

I am not prepared to offer any scientific explanation of the rôle played by the sulphide or similar agent. It may be that such substances affect the surface tension of the water with respect to sulphur, or it may be that they modify the surface of the sulphur particles in a way to promote wetting thereof by the water. In any event, these substances have some modifying action on either the water or the sulphur, or both, which enables the grinding of the sulphur in ball mills and the like to a far greater degree of fineness than is possible in the absence of such substances.

The sulphide, or other appropriate modifying agent, may be added to the sulphur, or to the water, or to the mixture of sulphur and water or other sulphur-containing liquid mixture. The essential condition is to have the modifying substance present during the grinding operation. As will be more fully described hereinafter, the sulphide may be formed at some early stage in the process of the manufacture of the sulphur-containing material looking towards the use of the sulphide to aid in bringing the sulphur by grinding to sizes of particles approaching the colloidal state.

In practicing the invention, I have secured excellent results by forming the sulphide by the direct union of a part of the sulphur to be ground with a base, such as calcium, barium, magnesium, or the like. To this end, refined sulphur, crude sulphur, commercial sulphur flour or flowers of sulphur are placed in a suitable container for melting. A small amount (less than 10% the weight of the sulphur) of an appropriate base, for example, burned lime or the hydroxide of the same, is then mixed with the sulphur. An amount of water sufficient to wet the mass after it is heated is added. The mass is heated with stirring and the moisture boiled off. Heating is continued until the whole mass melts into a liquid which is for the most part molten sulphur. Stirring is continued during the entire melting operation. The molten mass is then poured out and allowed to solidify. The resulting solidified product is then broken up and can be effectively ground to a very fine state of subdivision by ball mills (either wet or dry) or by other appropriate grinding instrumentalities.

In accordance with my preferred practice, the solidified product, produced in accordance with the method described in the preceding paragraph, is ground in the presence of water in a ball mill, pebble mill, or the like. The solidified product is first crushed and then introduced into the grinding apparatus. The product consists largely of sulphur which by virtue of being in contact with a small amount of sulphide, and perhaps polysulphide, is easily wet and capable of being reduced by grinding to a state of subdivision approximating the colloidal state.

After the grinding operation, the ground product may be partially or completely dried, and can be marketed as an article of commerce in the form of either a paste or a powder. In using the product as a spray material, a specified quantity may be either mixed with a certain amount of water in a suitable dispenser of spray material and put on the objects to be sprayed by the usual appliances or used as a dusting material or a constituent of the same.

I claim:—

1. The method of preparing finely divided sulphur which comprises subjecting sulphur in the presence of an alkali-earth sulfide to a grinding operation.

2. The method of preparing sulphur in a fine state of subdivision for use in spraying and the like which comprises subjecting a mixture of sulphur and an alkali-earth-sulphur compound to a grinding operation.

3. The method of preparing sulphur in a fine state of subdivision for use in spraying and the like which comprises subjecting a mixture of sulphur and a calcium-sulphur compound to a grinding operation.

4. The method of conditioning sulphur for use in spraying and the like which comprises grinding sulphur in the presence of water and a calcium-sulphur compound.

5. The method of preparing sulphur for use in spraying and the like which comprises melting a mixture of sulphur and a base, solidifying the resulting mixture, and subjecting the solidified material to a grinding operation.

6. The method of preparing sulphur for use in spraying and the like which comprises melting a mixture of sulphur and a base of an alkali-earth metal, solidifying the resulting mixture, and subjecting the solidified material to a grinding operation.

7. The method of preparing sulphur for use in spraying and the like which comprises melting a mixture of sulphur and a calcium compound, solidifying the resulting mixture, and subjecting the solidified material to a grinding operation.

8. The method of preparing sulphur for use in spraying and the like which comprises melting a mixture composed for the most part of sulphur and containing up to 10% by weight of a base of an alkali earth metal, stirring the molten mass to secure thorough mixture of the constituents thereof, solidifying the mixture, and subjecting the solidified material to a grinding operation in the presence of water.

In testimony whereof I affix my signature.

HARRY A. NOYES.